US006820200B2

(12) United States Patent
Takeuchi et al.

(10) Patent No.: US 6,820,200 B2
(45) Date of Patent: *Nov. 16, 2004

(54) INFORMATION PROCESSING APPARATUS AND METHOD AND RECORDING MEDIUM

(75) Inventors: Akikazu Takeuchi, Tokyo (JP); Shinji Nanba, Kanagawa (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 304 days.

This patent is subject to a terminal disclaimer.

(21) Appl. No.: 09/065,432

(22) Filed: Apr. 24, 1998

(65) Prior Publication Data

US 2002/0046345 A1 Apr. 18, 2002

(30) Foreign Application Priority Data

Apr. 30, 1997 (JP) .............................................. 9-112179

(51) Int. Cl.[7] .......................... H04L 9/00; G06F 11/30; G06F 17/60
(52) U.S. Cl. ........................ 713/179; 713/187; 705/59
(58) Field of Search ................................ 713/176, 179, 713/187, 188; 705/59

(56) References Cited

U.S. PATENT DOCUMENTS

| 4,924,378 A | * | 5/1990 | Hershey et al. ................ 705/59 |
| 5,050,212 A | | 9/1991 | Dyson ......................... 713/187 |
| 5,136,647 A | * | 8/1992 | Haber et al. ................. 713/178 |
| 5,224,160 A | | 6/1993 | Paulini et al. .................. 380/4 |
| 5,311,591 A | | 5/1994 | Fischer ....................... 713/156 |
| 5,343,527 A | | 8/1994 | Moore ......................... 713/179 |
| 5,724,425 A | | 3/1998 | Chang et al. ................ 713/187 |

FOREIGN PATENT DOCUMENTS

EP          0706118       4/1996    ............. G06F/9/06

* cited by examiner

Primary Examiner—Gilberto Barrón
Assistant Examiner—Douglas Meislahn
(74) Attorney, Agent, or Firm—Jay H. Maioli

(57) ABSTRACT

An application program that was encrypted by using a predetermined secret key is input to an input section that is a part of a program execution system, and encrypted sentences as the encrypted application program are supplied to a decoding section as they are. The decoding section is supplied not only with the encrypted sentences from the input section but also with a publicized key corresponding to a secret key that was used in generating the encrypted sentences. The decoding section decodes the encrypted sentences by using the publicized key and supplies Java byte codes as a decoding result to a Java virtual machine. The Java virtual machine interprets and executes the Java byte codes that are supplied from the decoding section.

4 Claims, 14 Drawing Sheets

FIG.8A
EXECUTION RESULT IN ACTUAL COMPUTER
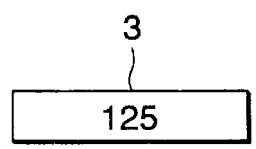
FIG.8B
EXECUTION RESULT AS VIEWED FROM JAVA VIRTUAL MACHINE
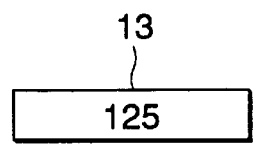
FIG.9
PROGRAM CERTIFICATE AUTHORITY
SOFTWARE DEVELOPER
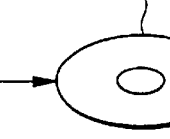
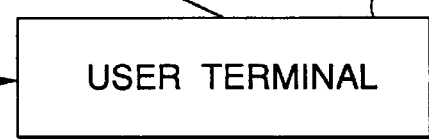
USER
PROGRAM PROVIDING SYSTEM

ENCRYPTION/DECODING SYSTEM USING DIGITAL SIGNATURE

INFORMATION PROCESSING APPARATUS AND METHOD AND RECORDING MEDIUM

BACKGROUND OF THE INVENTION

The present invention relates to an information processing apparatus and method and a recording medium. In particular, the invention relates to an information processing apparatus and method and a recording medium which allow only programs that were developed by a legitimate program developer to be executed in, for instance, a certain program execution environment.

Java (trademark of Sun Microsystems, Inc. of the U.S.A.) now attracts much attention because it is suitable for the Internet that has spread rapidly in recent years. The term "Java" is used to refer to each of the Java language which is an object-oriented language, a virtual machine (hereinafter referred to as "Java virtual machine" where appropriate) that defines a processor architecture suitable for execution of a program (hereinafter referred to as "Java program" where appropriate) written in the Java language, and other elements relating to Java, or it is used as a generic term of those. The term "virtual machine" is not intended to represent a case that a single computer virtually behaves to users as if it were a plurality of computers; it means a virtual machine that is assumed in implementing a language processing system.

A Java virtual machine is implemented so as to operate on various kinds of software, OS's (operating systems), and hardware. On the other hand, a Java program is compiled into binary codes that are constituted of instruction sets of the Java virtual machine. The binary codes can be executed by any hardware in which the Java virtual machine can operate. Therefore, a complied Java program can be executed on various platforms as long as the Java virtual machine operates there.

Based on the fact that a Java program can be executed on any machine once a Java virtual machine is implemented, and other grounds, it is expected that the Java virtual machine will spread to many users. It is also expected that many application programs will be developed and distributed (irrespective of whether they have to be paid for or are free) to many such users.

Under the above circumstances, there may occur a case that a party who has developed and distributed a program execution environment such as a Java virtual machine wants to restrict the distribution of an application program that was developed by a third party and is executed in the program execution environment developed by the former party; for example, the former party may want to permit distribution of application programs to only licensed parties.

On the other hand, in a Java virtual machine, intermediate codes called byte codes (Java codes) that are obtained by compiling a Java program with a Java compiler are interpreted and executed. Java byte codes can be understood relatively easily by discompiling those, which enables reverse engineering for imitation or the like of the program to be performed easily. Therefore, it is necessary to prevent imitation and falsification of application programs by other parties.

SUMMARY OF THE INVENTION

The present invention has been made under the above circumstances, and an object to the invention is therefore to make it possible to restrict the execution of a program in a certain program execution environment as well as to prevent imitation and falsification of a program.

According to the invention, there is provided an information processing apparatus which executes a process for executing a program, comprising decoding means for decoding an encrypted version of the program; and executing means for executing the program that is output from the decoding means.

There is also provided an information processing apparatus which executes a program, comprising encrypting means for encrypting a program into encrypted sentences to be decoded into executable codes.

There is also provided an information processing apparatus which executes a process for executing a program, comprising executing means for executing the program; checking means for checking whether the program is an execution-permitted, legitimate one; and supplying means for supplying the executing means with the program that has been affirmed to be a legitimate one by the checking means.

There is further provided an information processing apparatus which executes a program, comprising processing means for processing a program so that the program will be affirmed to be legitimate in the information processing.

According to another aspect of the invention, there is provided an information processing method for executing a process for executing a program, comprising the steps of decoding an encrypted version of the program; and executing the program that is obtained by the decoding step.

There is also provided an information processing method for executing a program, comprising the step of encrypting a program into encrypted sentences to be decoded into codes that can be executed by an information processing apparatus.

There is also provided an information processing method for executing a process for executing a program, comprising the steps of checking whether the program is an execution-permitted, legitimate one; and executing the program only when it is affirmed to be a legitimate one.

There is further provided an information processing method for executing a program, comprising the step of processing a program so that the program will be affirmed to be legitimate in the information processing.

According to a further aspect of the invention, there is provided a recording medium on which a program is recorded, the program being for causing a computer to execute the steps of decoding an encrypted version of a program; and executing the program that is obtained by the decoding step.

There is also provided a recording medium on which a program is recorded, the program being encrypted into encrypted sentences to be decoded into codes that can be executed by the information processing apparatus.

There is also provided a recording medium on which a program is recorded, the program being for causing a computer to execute the steps of checking whether a program is legitimate; and executing the program only when it is affirmed to be legitimate.

There is further provided a recording medium on which a program is recorded, the program having been processed so that the program will be affirmed to be legitimate in the information processing apparatus.

BRIEF DESCRIPTION OF THE DRAWINGS

FIG. 8 illustrates a register mapping of the Java virtual machine 11;

FIG. 9 is a block diagram showing an example of configuration of an embodiment of a program providing system according to the present invention;

DETAILED DESCRIPTION OF THE PREFERRED EMBODIMENTS

The embodiments of the present invention will be described below. Before that, to clarify the correlation between the respective means of the invention that are described in the claims and the components of the following embodiments, the features of the invention will be described below in such a manner that the respective means are followed, in parentheses, by the corresponding components (just examples) of the embodiments.

The information processing apparatus recited in claim 1 is an information processing apparatus which executes a process for executing a program, comprising decoding means (for example, a decoding section 82 shown in FIG. 1) for decoding an encrypted version of the program; and executing means (for example, a Java virtual machine 83 shown in FIG. 1) for executing the program that is output from the decoding means.

The information processing apparatus recited in claim 2 is an information processing apparatus which executes a program, comprising encrypting means (for example, a program processing step S14 shown in FIG. 2) for encrypting a program into encrypted sentences to be decoded into executable codes.

Figure 3:
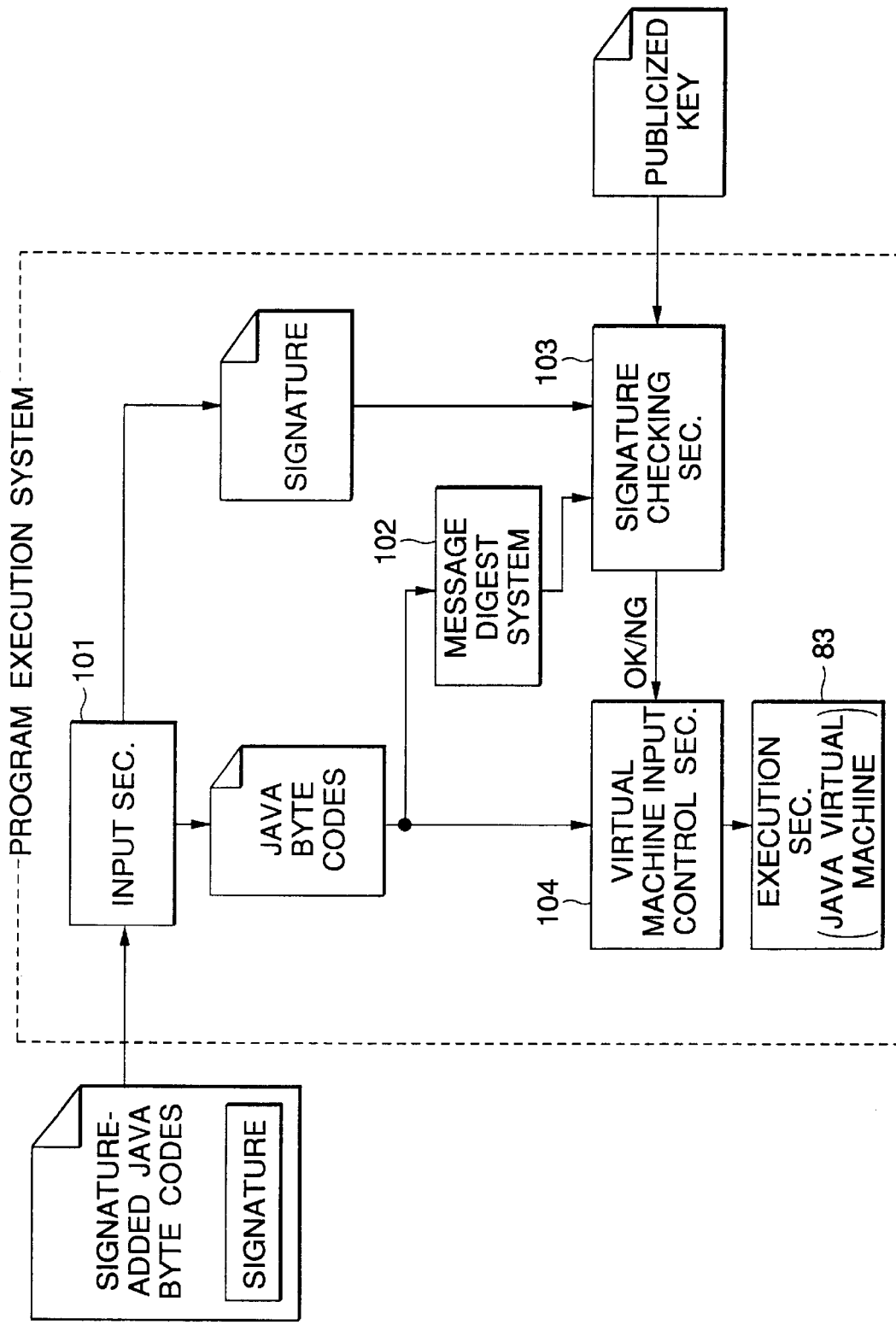
FIG. 3 is a block diagram showing a third example of functional configuration of a program execution system.

The information processing apparatus recited in claim 5 is an information processing apparatus which executes a program, comprising executing means (for example, a Java virtual machine 83 shown in FIG. 3) for executing the program; checking means (for example, a signature checking section 103 shown in FIG. 3) for checking whether the program is an execution-permitted, legitimate one; and supplying means (for example, a virtual machine input control section 104 shown in FIG. 3) for supplying the executing means with the program that has been affirmed to be a legitimate one by the checking means.

The information processing apparatus recited in claim 8 is an information processing apparatus which executes a program, comprising processing means (for instance, program processing steps S24 and S25 shown in FIG. 4) for processing a program so that the program will be affirmed to be legitimate in the information processing apparatus according to claim 5.

Naturally, the above statements do not mean that the respective means are limited to the components that follow.

Next, a description will be made of a case where the invention is applied to a Java virtual machine, though the invention can be applied to a real machine itself in addition to a virtual machine such as a Java virtual machine.

Since Java is described in detail in, for instance, Nikkei Electronics 1996.3.25 (no. 658) and 1996.6.17 (no. 664) published by Nikkei Business Publications, Inc., it will be described below only briefly.

A Java virtual machine is an abstracted execution machine and is actually a program that is executed by an actual computer. Like an actual computer, a Java virtual machine has a program counter, a stack register, a general-purpose register, a memory as a stack or a heap, and other resources, and those resources are mapped to resources of an actual computer.

Figure 5:
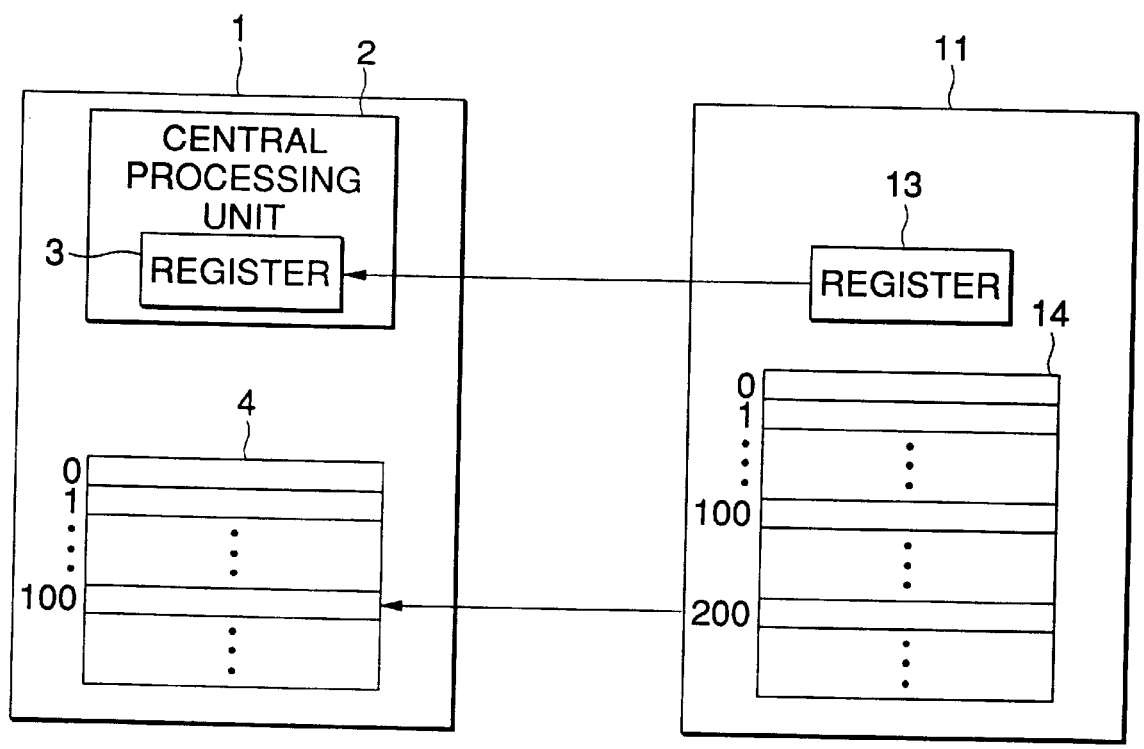
FIG. 5 shows a correlation between resources of a computer 1 and those of a Java virtual machine 11 that is implemented on the computer 1.
Figure 6:
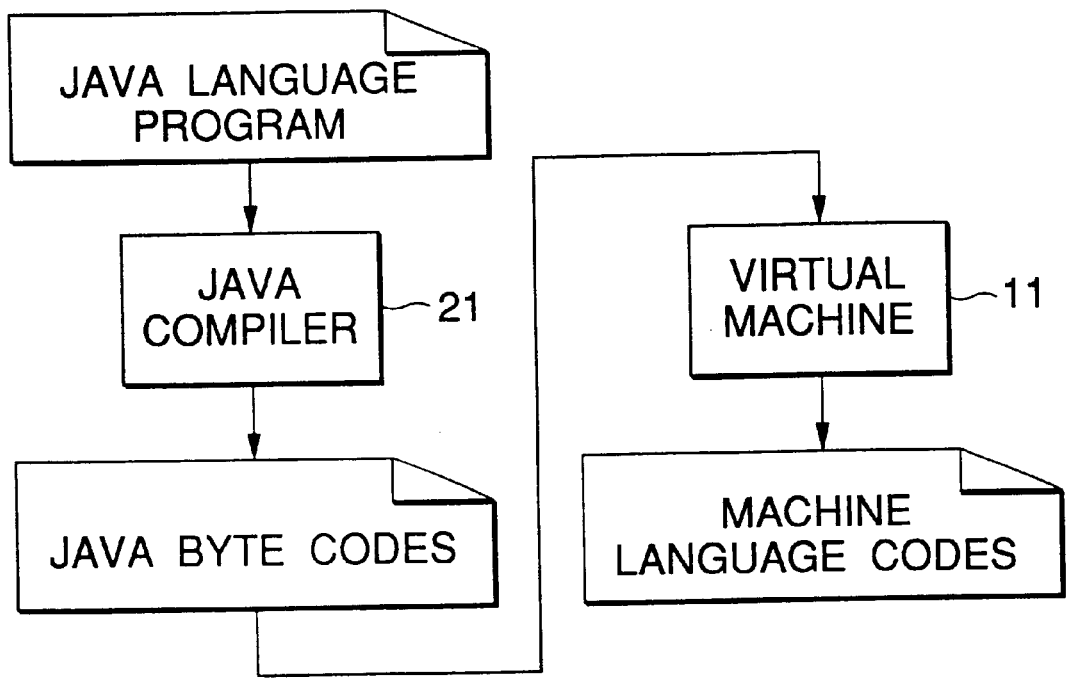
FIG. 6 illustrates a process of the Java virtual machine 11.

Assume that an actual computer 1 has a central processing unit 2, a register 3 that is incorporated in the central processing unit 2, a memory 4, and other resources as shown in FIG. 5. When a Java virtual machine 11 is implemented on the computer 1, the resources of the actual computer 1 are mapped to those of the Java virtual machine 11. In the embodiment of FIG. 5, the Java virtual machine 11 has a register 13, a memory 14, and other resources. The register 13 is mapped to the register 3 and address 200 of the memory 14 is mapped to address 100 of the memory 4.

In the actual computer 1, an instruction to the central processing unit 2 is executed as a manipulation on its resource. Similarly, in the Java virtual machine 11, instructions to be executed as manipulations on its resources are defined. The Java language is a language to describe instructions to the Java virtual machine 11. In the Java virtual machine 11, Java byte codes that are obtained by compiling a source program described in the Java language with a Java compiler are interpreted and executed.

Figure 2:
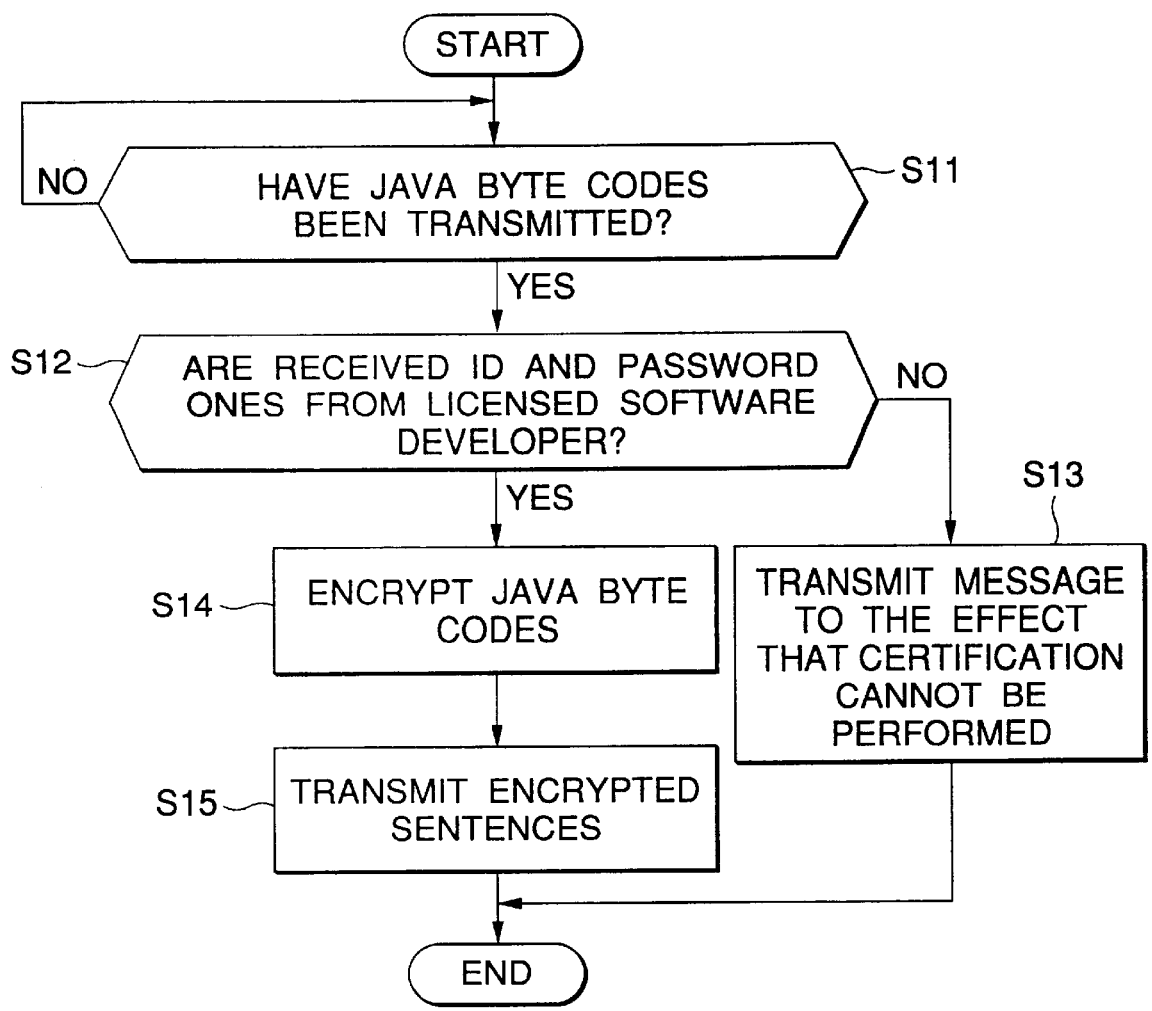
FIG. 2 is a flowchart showing a process of a program certificate authority server 32.
Figure 7:
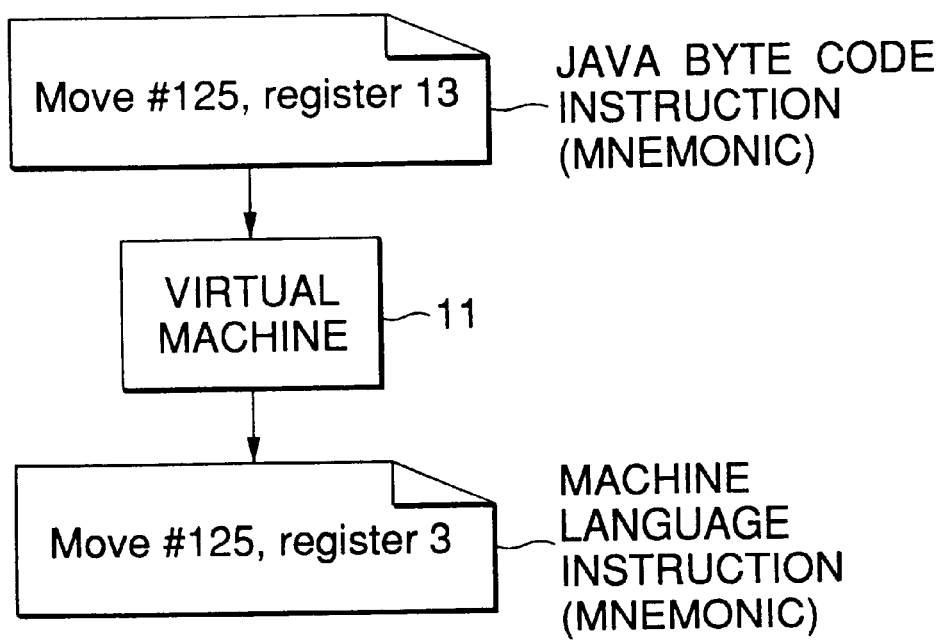
FIG. 7 illustrates an instruction conversion process of the Java virtual machine 11.

That is, as shown in FIG. 2, a Java language program that is a source program written in the Java language is compiled into Java byte codes by a Java compiler 21. The Java byte codes are input to the Java virtual machine 11, where they are converted into machine language codes that can be interpreted by the actual computer 1 (central processing unit 2). More specifically, for example, as shown in FIG. 7, when an instruction (Java byte code instruction) "move #125, register 13" described in Java byte codes and meaning "set numeral "125" in the register 13" is input to the Java virtual machine 11, the Java virtual machine 11 converts it into an instruction (machine language instruction) "move #125, register 3" described in machine language codes.

In the computer 1, numeral "125" is set in the register 3 of the computer 1 as shown in FIG. 8A as a result of execution of the instruction written in machine language codes.

As described above, the register 13 of the Java virtual machine 11 is mapped to the register 3 of the computer 1.

Therefore, setting numeral "125" in the register 3 of the computer 1 as shown in FIG. 8A means setting numeral "125" in the register 13 when viewed from the Java virtual machine 11 as shown in FIG. 8B.

In the above manner, a Java byte code instruction that is input to the Java virtual machine 11 is converted into machine language codes for the computer 1 and then executed as a manipulation on a resource of the computer 1 that is mapped to a resource of the Java virtual machine 11. When viewed from the Java virtual machine 11, the above manipulation corresponds to a manipulation on the resource of the Java virtual machine 11; execution of the former manipulation means execution of the Java byte code instruction.

Therefore, as described above, by implementing a Java virtual machine on an actual computer, a compiled Java program can be executed irrespective of the CPU (central processing unit) and the OS used in the computer.

An example of a technique for converting Java byte codes into machine language codes and executing the latter is an interpreter scheme in which interpretation of instructions into machine language codes and execution of the machine language codes are performed one by one as in the case of executing a Basic language program. Another example is a JIT (just in time) compiler scheme in which interpretation of instructions into machine language codes and execution of the machine language codes are performed en bloc.

The interpreter scheme employed in executing a Basic language program is different from that used in interpreting Java byte codes in that source codes are interpreted in the former scheme whereas intermediate codes (Java byte codes) are interpreted in the latter scheme. However, these two schemes are not discriminated in this embodiment (it is not necessary to do so).

FIG. 9 shows an example of configuration of an embodiment of a program providing system according to the invention (the term "system" means a collection of a plurality of devices that are logically related to each other; whether the devices are accommodated in a single chassis is irrelevant).

In this program providing system, when a software developer distributed to a user an application program that is not certified by a program certificate authority, execution of the application program on a user terminal 33 of the user is restricted.

For example, when a software developer has developed an application program that operates on a Java virtual machine, the software developer transmits Java byte codes that have been obtained by compiling the application program via a network 34 that is the Internet, public lines, a CATV network, a ground wave network, a satellite network, or the like from a software developer server 31 to a program certificate authority server 32.

When receiving the Java byte codes from the software developer server 31, the program certificate authority server 32 certifies those and transmits the certified Java byte codes to the software developer server 31 via the network 34. The software developer server 31 receives and stores the certified Java byte codes that are transmitted from the program certificate authority server 32.

Upon receiving a request for the application program from a user terminal 33, the software developer server 31 transmits the application program to the user terminal 33 via the network 34. For example, a Java virtual machine as a program execution environment that has been developed or distributed by the program certificate authority or a party who requested to the program certificate authority to certify programs is implemented in the user terminal 33. In the user terminal 33 as the Java virtual machine, the application program that is transmitted from the software developer server 31 is executed correctly only when it is certified by the program certificate authority.

That is, where an application program that has been transmitted from the software developer server 31 is not certified by the program certificate authority, it cannot be executed normally on the user terminal 33 as the Java virtual machine.

As a result, a party who has developed and distributed a Java virtual machine as a program execution environment can restrict distribution of an application program that was developed by a third party and is executed on the Java virtual machine. For example, the former party can permit distribution of application programs to only licensed software developers.

Software developers can distribute an application program to users by recording it on a recording medium 35 such as a CD (compact disc)-ROM or a magnetic disk and, for instance, sending it by mail or selling it over the counter. Even in this case, as in the above-described example, such an application program cannot be executed in the user terminal 33 as a Java virtual machine if the application program is not certified by the program certificate authority.

Although in the above example the data are exchanged between the software developer and the program certificate authority via the network 34, the data exchange between those parties may also be done by, for instance, sending a recording medium 35 on which the data are recorded by mail.

Further, although in the embodiment of FIG. 9 the software developer server 31, the program certificate authority server 32, and the user terminal 33 are each provided by one, they may each be provided in plurality.

Figure 10:
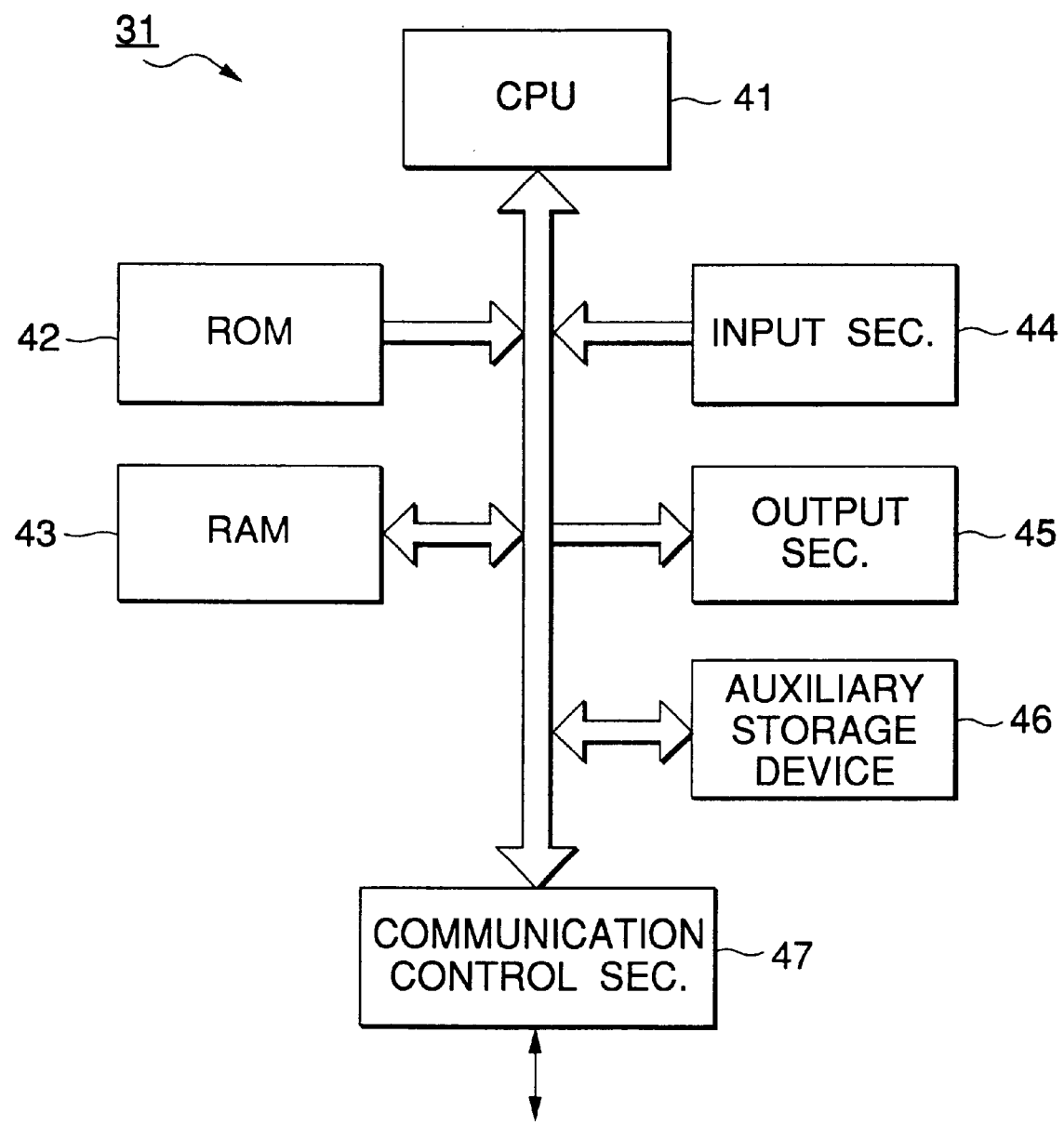
FIG. 10 is a block diagram showing an example of configuration of a software developer server 31 shown in FIG. 9.

FIG. 10 shows an example of configuration of the software developer server 31 shown in FIG. 9.

A CPU 41 executes various kinds of processes by executing programs stored in an auxiliary storage device 46 under the control of an operating system that is stored (recorded) in the auxiliary storage device 46. A ROM (read-only memory) 42 stores an IPL (initial program loading) program and other programs. A RAM (random access memory) 43 stores a program to be executed by the CPU 41 and data necessary for operation of the CPU 41. An input section 44, which is a keyboard or a mouse, for instance, is manipulated in inputting a desired command or data, or the like. An output section 45, which is a display device or a printer, for instance, displays or prints necessary information. The auxiliary storage device 46, which is a hard disk drive, for instance, stores the operating system and other programs to be executed by the CPU 41, as well as execution results of the CPU 41 and other necessary data. A communication control section 47 controls communications that are performed via the network 34.

Figure 11:
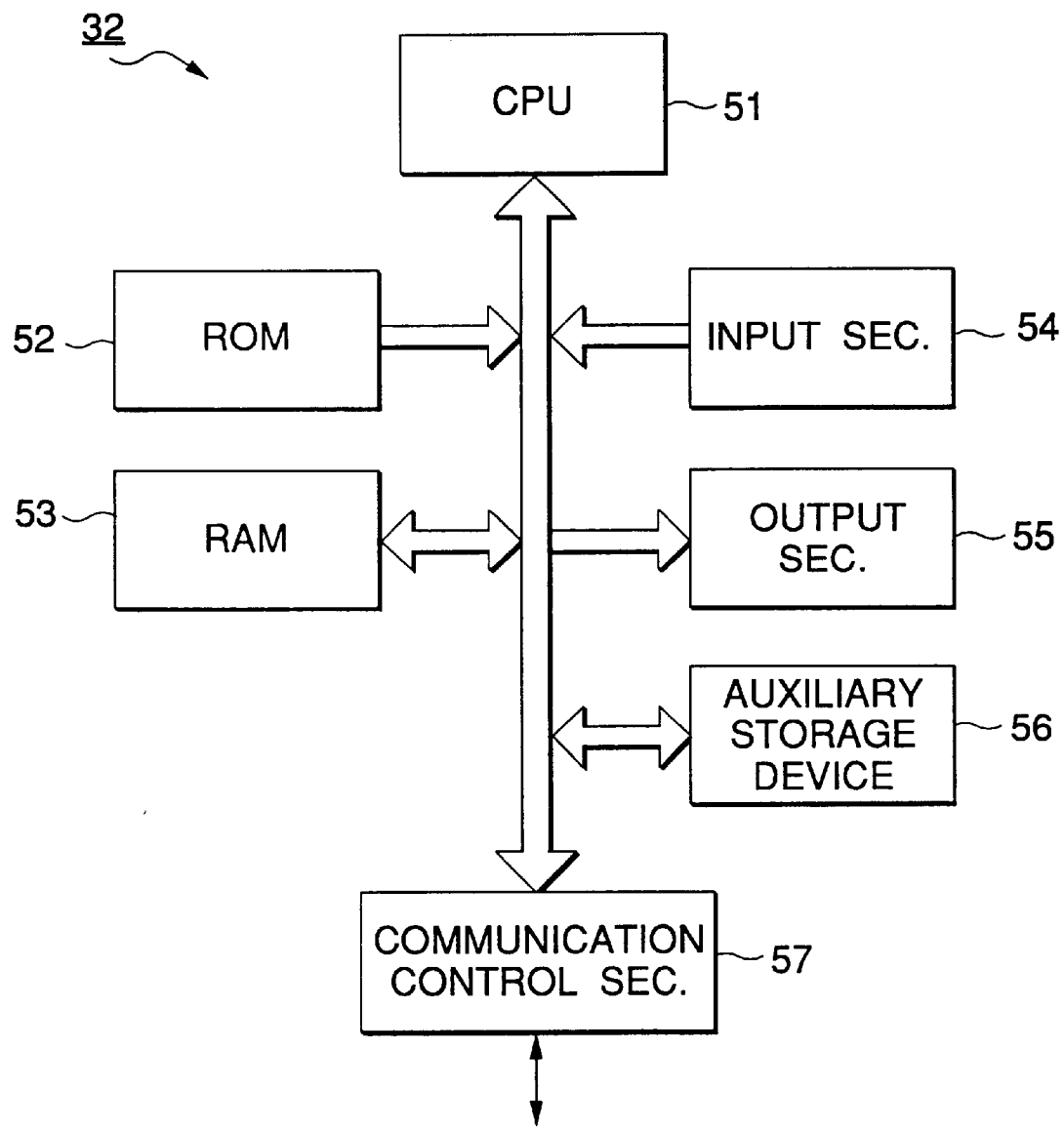
FIG. 11 is a block diagram showing an example of configuration of a program certificate authority server 32 shown in FIG. 9.
Figure 12:
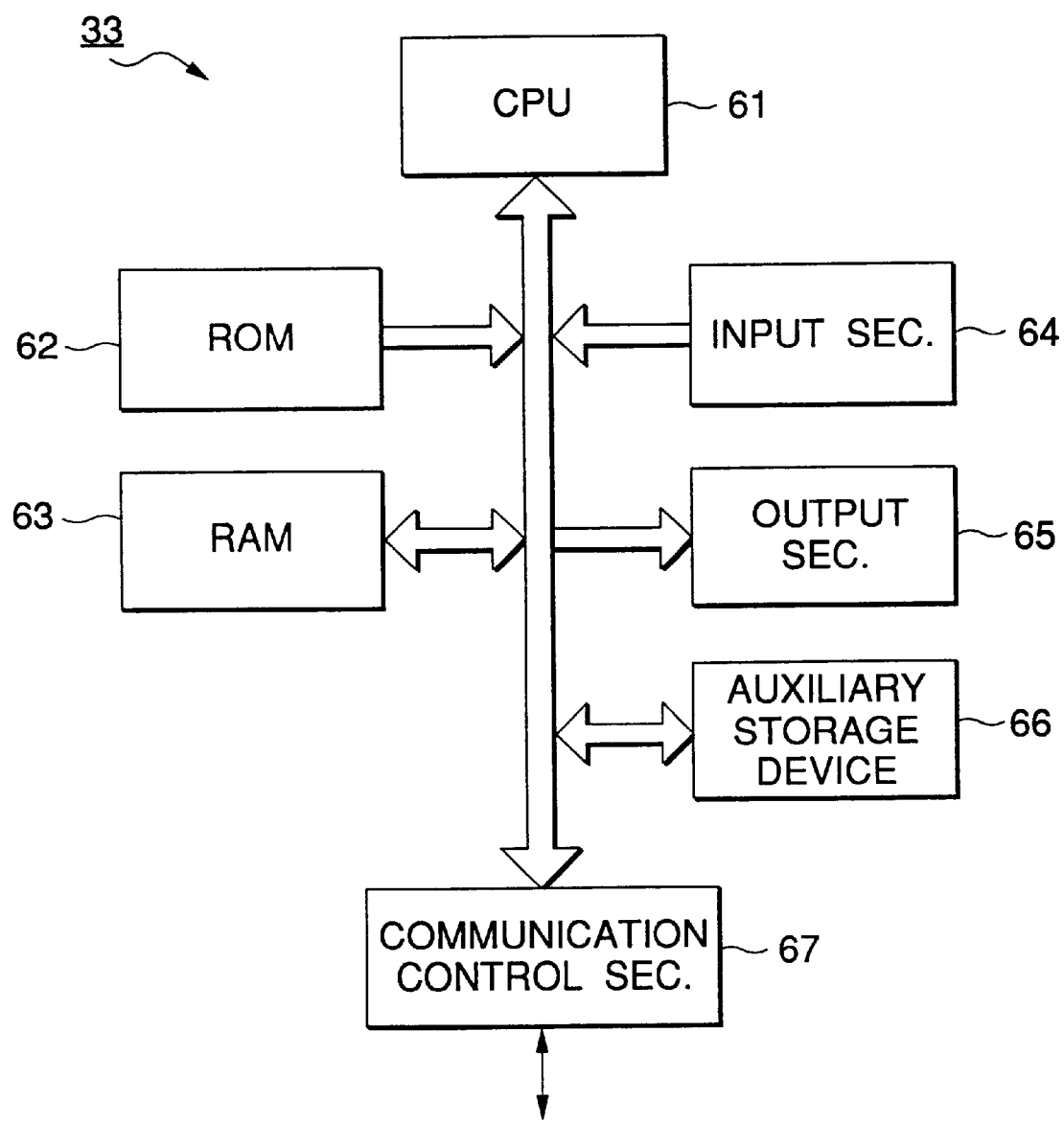
FIG. 12 is a block diagram showing an example of configuration of a user terminal 33 shown in FIG. 9.

FIG. 11 shows an example of configuration of the program certificate authority server 32 shown in FIG. 9 and FIG. 12 shows an example of configuration of the user terminal 33 shown in FIG. 9.

The program certificate authority server 32 is composed of a CPU 51 to a communication control section 57 and the user terminal 33 is composed of a CPU 61 to a communication control section 67. Since the above components are configured in the same manner as the CPU 41 to the communication control section 47 of FIG. 10, descriptions therefor are omitted.

Figure 13:
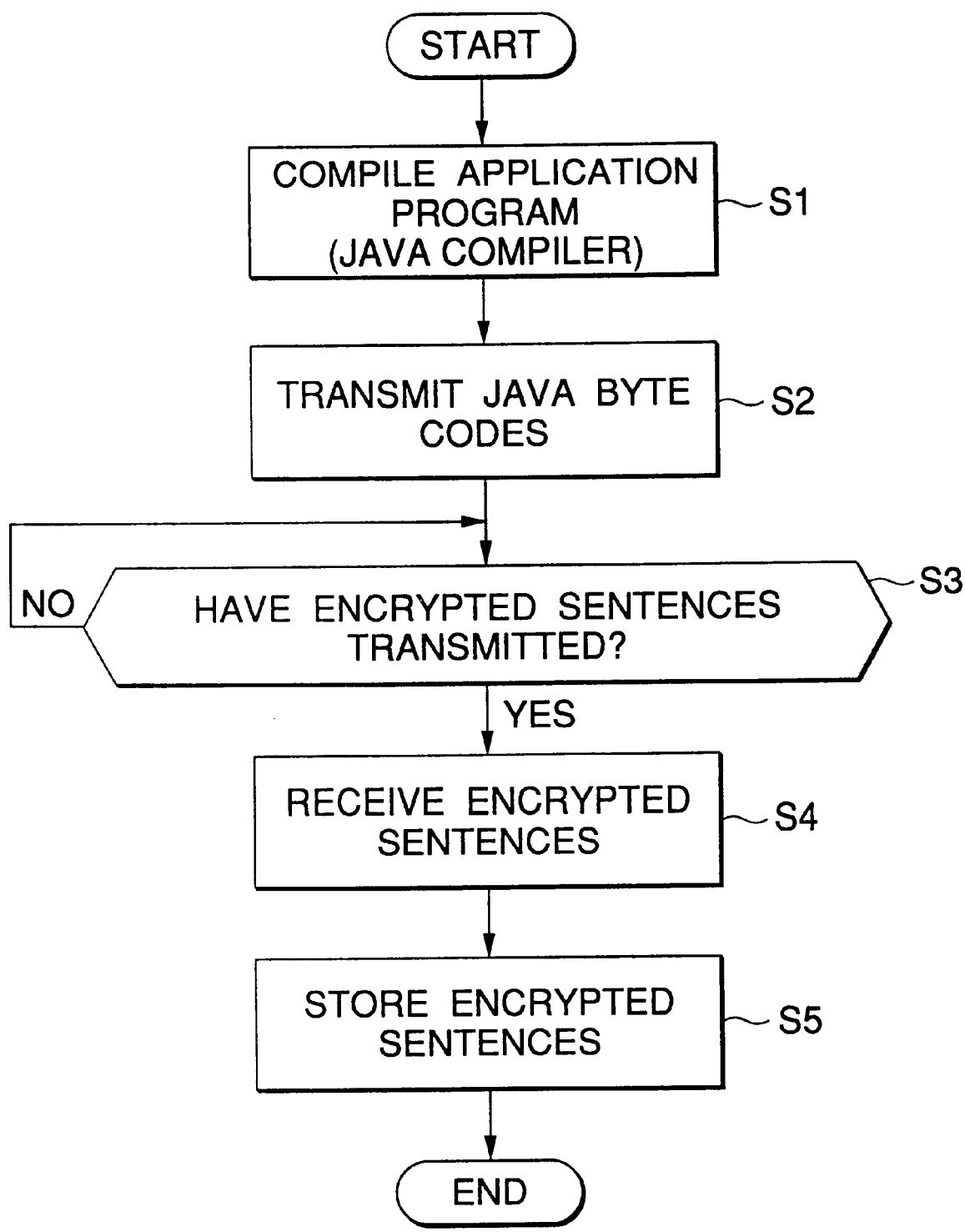
FIG. 13 is a flowchart showing a process of the software developer server 31.

Next, a process of the software developer server 31 will be described with reference to a flowchart of FIG. 13.

An application program that has been developed by the software developer and is to be executed on a Java virtual machine is stored (recorded) in the auxiliary storage device 46, for instance. In the software developer server 31, first, at step S1, the CPU 41 compiles the application program that is stored in the auxiliary storage device 46 into Java byte codes according to a Java compiler program. The Java byte codes are also supplied to the auxiliary storage device 46 and stored there.

The process then goes to step S2, where the communication control section 47 reads out the Java byte codes as the application program that are stored in the auxiliary storage device 46 and transmits those to the program certificate authority server 32 via the network 34. The process then goes to step S3, where the CPU 41 judges whether encrypted sentences as an encrypted version of the application program, i.e., a certified application program (Java byte codes), have been transmitted from the program certificate authority server 32. If it is judged that encrypted sentences have not been transmitted, the process returns to step S3.

If it is judged at step S3 that encrypted sentences have been transmitted, the process goes to step S4, where the encrypted sentences are received by the communication control section 47. The process then goes to step S5, where the encrypted sentences received by the communication control section 47 are transferred to the auxiliary storage device 46. The process is then finished.

Next, a process of the program certificate authority server 32 will be described with reference to a flowchart of FIG. 2.

For example, the program certificate authority is a party who developed or distributed a Java virtual machine as a program execution environment or an organization that is requested by that party to act on its behalf. For example, the program certificate authority server 32 executes a program certification process for certificating an application program sent from a licensed party.

Specifically, this is done in the following manner. First, at step S11, the CPU 51 of the program certificate authority server 32 judges whether Java byte codes, i.e., an application program as a subject of certification, have been transmitted from, for instance, the software developer server 31 via the network 34. If it is judged that Java byte codes have not been transmitted yet, the process returns to step S11. If it is judged at step S11 that Java byte codes have been transmitted, the process goes to step S12, where the CPU 51 judges whether the Java byte codes are codes from a licensed software developer (hereinafter referred to as "regular software developer" where appropriate).

The program certificate authority makes, with a software developer, a license contract that permits the software developer to, for instance, develop and distribute an application program that is executed on the Java virtual machine. Then, the program certificate authority issues, for instance, an ID and a password to the software developer. The ID and the password that were issued at the time of license contract are transmitted from the licensed, i.e., regular, software developer to the program certificate authority together with Java byte codes as a subject of certification. At step S12, the program certificate authority makes the judgment as to whether the Java byte codes are from a regular software developer based on these ID and password.

If it is judged at step S12 that the Java byte codes are not from a regular software developer, that is, when they have been transmitted from a software developer with whom no license contact is made, the process goes to step S13, where the communication control section 57 transmits, to the software developer, a message to the effect that the Java byte codes cannot be certified unless a license contact is made. The process is then finished.

On the other hand, if it is judged at step S12 that the Java byte codes are from a regular software developer, the process goes to step S14, where the CPU 51 encrypts the Java byte codes into encrypted sentences. The Java byte codes are thus certified.

The process then goes to step S15, where the communication control section 57 transmits the encrypted sentences as a certification result of the Java byte codes to the software developer who transmitted the Java byte codes (in this example, the software developer server 31) via the network 34. The process is then finished.

Next, a description will be made of a method of the encryption that is performed at step S14 in the program certificate authority server 32.

In the program certificate authority server 32, Java byte codes are encrypted, for instance, according to the publicized key encryption scheme as typified by the RSA scheme (developed by the three researchers of MIT; RSA is their initials).

Figure 14:
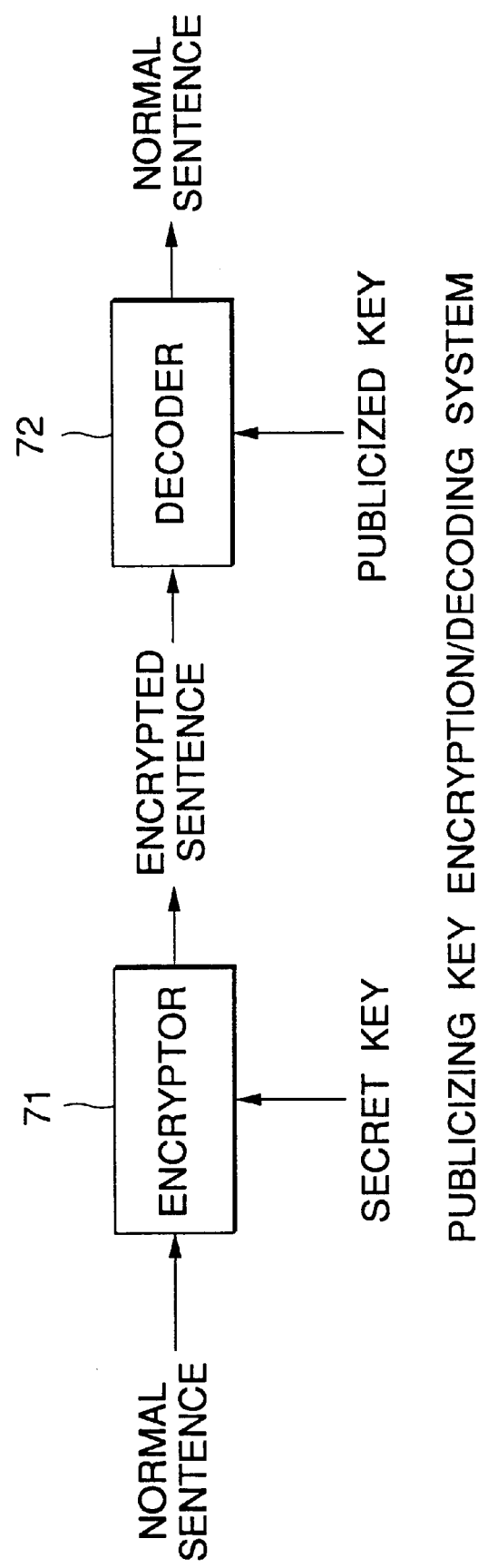
FIG. 14 is a block diagram showing an example of configuration of an encryption/decoding system.

FIG. 14 shows an example of configuration of an encryption/decoding system according to the publicized key encryption scheme as an examplary encryption scheme.

A normal sentence as a subject of encryption is input to an encryptor 71. The encryptor 71 encrypts the normal sentence into an encrypted sentence by using an encryption key that is called a secret key and is unique to each person.

On the other hand, an encrypted sentence produced by the encryptor 71 is input to a decoder 72. The decoder 72 decodes the encrypted sentence into the original normal sentence by using a decoding key called a publicized key and is open to the public.

The program certificate authority server 32 encrypts Java byte codes that are transmitted from the software developer server 31 into encrypted sentences by using a secret key that is specific to the Java byte codes.

The encryption method is not limited to the publicized key encryption scheme and other schemes such as the secret key encryption scheme as typified by the DES (data encryption standard) scheme (developed by IBM Corp. and put into practical use as a standard of the U.S. government) may also be used.

Figure 1:
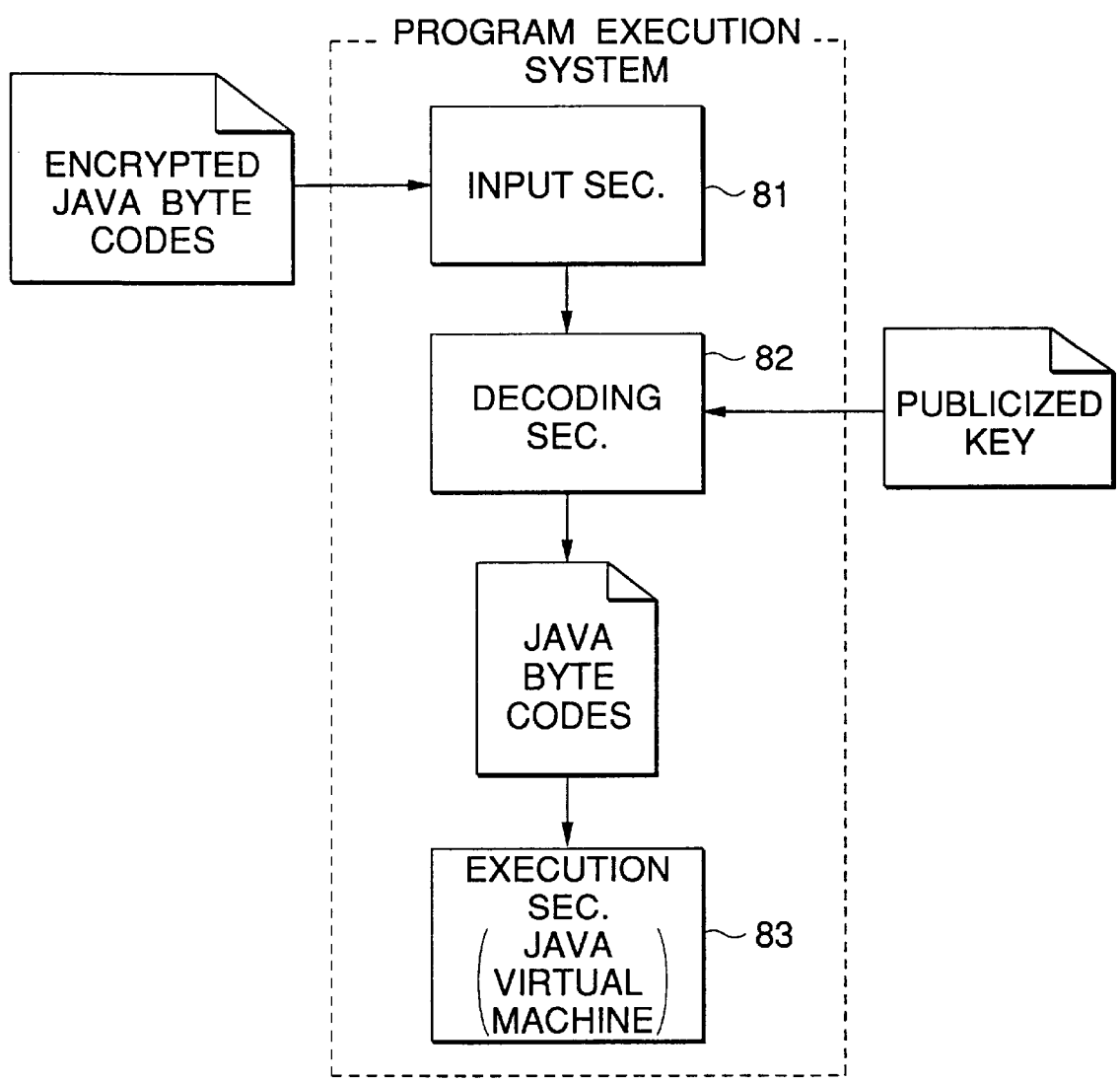
FIG. 1 is a block diagram showing a first example of functional configuration of a program execution system.

FIG. 1 shows an example of functional configuration of a program execution system as a program execution environment for executing an application program in the user terminal 33.

An input section 81 accepts encrypted sentences (encrypted Java byte codes) and supplies those to a decoding section 82. The decoding section 82 operates as the decoder 72 of FIG. 14, for instance. Specifically, the decoding section 82 decodes the output of the input section 81 into the original Java byte codes by using a publicized key. The Java byte codes obtained by the decoding section 82 are supplied to a Java virtual machine 83. The Java virtual machine 83 executes a process defined by the Java byte codes that are supplied from the decoding section 82.

In the above-configured program execution system, first, the input section 81 acquires encrypted sentences as an application program. For example, where encrypted sentences as an application program have been transmitted in advance from the software developer server 31 via the network 34 are stored as files in the auxiliary storage device 66, or where a recording medium 35 on which they are recorded as files is set in the user terminal 33, the input section 81 opens those files and reads out the encrypted sentences.

Consider a case where the software developer server 31 is connected to the Internet as the network 34. Where encrypted sentences as an application program are correlated with a URL (uniform resource locator) in such a software developer server 31, the input section 81 receives the encrypted sentences as the application program that are transmitted from the software developer server 31 via the network 34 when the user specifies the URL by manipulating the input section 64.

Consider another case where the software developer server 31 digitally broadcasts encrypted sentences as an application program by ground waves or through a satellite network as the network 34. In this case, the input section 81 receives the encrypted sentences that are broadcast.

The input section 81 supplies, as they are, the thus-acquired encrypted sentences as the application program to the decoding section 82.

The decoding section 82 is supplied with not only the encrypted sentences by the input section 81 but also a publicized key corresponding to a secret key that was used to generate the encrypted sentences.

The publicized key is managed by the program certificate authority, for instance, and is transmitted to the user terminal 33 via the network 34 in response to the user's request. Or the publicized key is delivered to the user by mail, for instance. Where a recording medium 35 on which the encrypted sentences as the program are recorded as a file is delivered to the user, the publicized key may be recorded on the recording medium 35 together with the encrypted sentences. It is also possible that after the Java byte codes are certified by the program certificate authority server 32 the publicized key is transmitted to the software developer server 31 together with the encrypted sentences as the certification result, and the publicized key is then delivered from the software developer to the user.

The decoding section 82 decodes the encrypted sentences that are supplied from the input section 81 by using the publicized key and supplies Java byte codes as a decoding result to the Java virtual machine 83. The Java virtual machine 83 interprets and executes the Java byte codes that are supplied from the decoding section 82.

As described above, the decoding section 82 decodes the encrypted sentences by using the publicized key (paired with the secret key) corresponding to the secret key that was used for the encryption in the program certificate authority server 32, and the decoding result is input to the Java virtual machine 83. Therefore, Java byte codes that can be executed normally by the Java virtual machine 83 are not output from the decoding section 82 if Java byte codes that are not certified by the program certificate authority are input to the decoding section 82. For example, this corresponds to a case where there occurs input of non-encrypted Java byte codes, Java codes that were encrypted according to a different encryption algorithm than used in the program certificate authority server 32, or Java byte codes that were encrypted according to the same algorithm as used in the program certificate authority server 32 without using the secret key that should be used in a regular case. As a result, it becomes possible to restrict distribution of Java byte codes that operate on the Java virtual machine 83 but are not certified by the program certificate authority to users having the user terminal 33 in which the Java virtual machine 83 is implemented.

In the above manner, it becomes possible to allow only software developers who have made a contract with the program certificate authority, to distribute Java byte codes that operate on the Java virtual machine 83 to users having the user terminal 33 in which the Java virtual machine 83 is implemented. The developer or the distributor of the Java virtual machine 83 can receive license fees for distribution of an application program that uses the Java virtual machine 83 from software developers who want to distribute Java byte codes that operate on the Java virtual machine 83.

It is necessary to take a measure to allow only the decoding section 82 to input Java byte codes to the Java virtual machine 83.

Upon reception of a certain input, the decoding section 82 shown in FIG. 1 executes a decoding process with respect to the input and outputs a processing result. Therefore, usually the Java virtual machine 83 runs away when Java byte codes that are not certified by the program certificate authority are input to the decoding section 82 and a processing result obtained with such Java byte codes is supplied to the Java virtual machine 83. In view of this, a procedure may be employed in which it is checked whether an output of the decoding section 82 is legitimate (normal) Java byte codes and the Java virtual machine 83 is allowed to interpret and execute Java byte codes only when the output of the decoding section 82 is legitimate Java codes. For example, the Java virtual machine 83 may be allowed to interpret and execute Java virtual machine when 32-bit data called "magic" that is located at the head of the Java byte codes has a regular value ("CAFEBABE" in hexadecimal notation), with a judgment that the output of the decoding section 82 is legitimate Java byte codes. The Java virtual machine 83 is thus prevented from running away.

The program certificate authority server 32 may certify Java byte codes by encrypting part of the Java byte codes, such as the above-mentioned data "magic," rather than all the Java byte codes. However, since the data "magic" is constituted of bits of as small a number as 32, it is expected that the data "magic" can be falsified more easily so that the decoding section 82 outputs the correct value than all the Java byte codes. Therefore, it is desirable to encrypt all the Java byte codes.

Incidentally, from the viewpoint of restricting execution of an application program on the Java virtual machine 83, there is no problem even if the decoding algorithm of the decoding section 82 of FIG. 12 or the publicized key used there is known to a third party as long as the encryption algorithm or the secret key that is used for the encryption is not known. That is, the execution of an application program on the Java virtual machine 83 can be restricted even if the decoding method of encrypted sentences is known as long as the method of generating encrypted sentences to be given to the decoding section 82 to supply the Java virtual machine 83 with Java byte codes that can be executed correctly.

However, if one knows the decoding method of encrypted sentences, he can obtain Java byte codes from encrypted sentences (encrypted sentences that are generated as a result of certification of Java byte codes by the program certificate authority). Since the contents of Java byte codes can be understood relatively easily by decompiling those, reverse engineering can be done easily.

To prevent such reverse engineering, the decoding method of encrypted sentences may be kept secret. For example, the publicized key to be used for decoding encrypted sentences may be kept secret, even though it is usually publicized.

Figure 15:
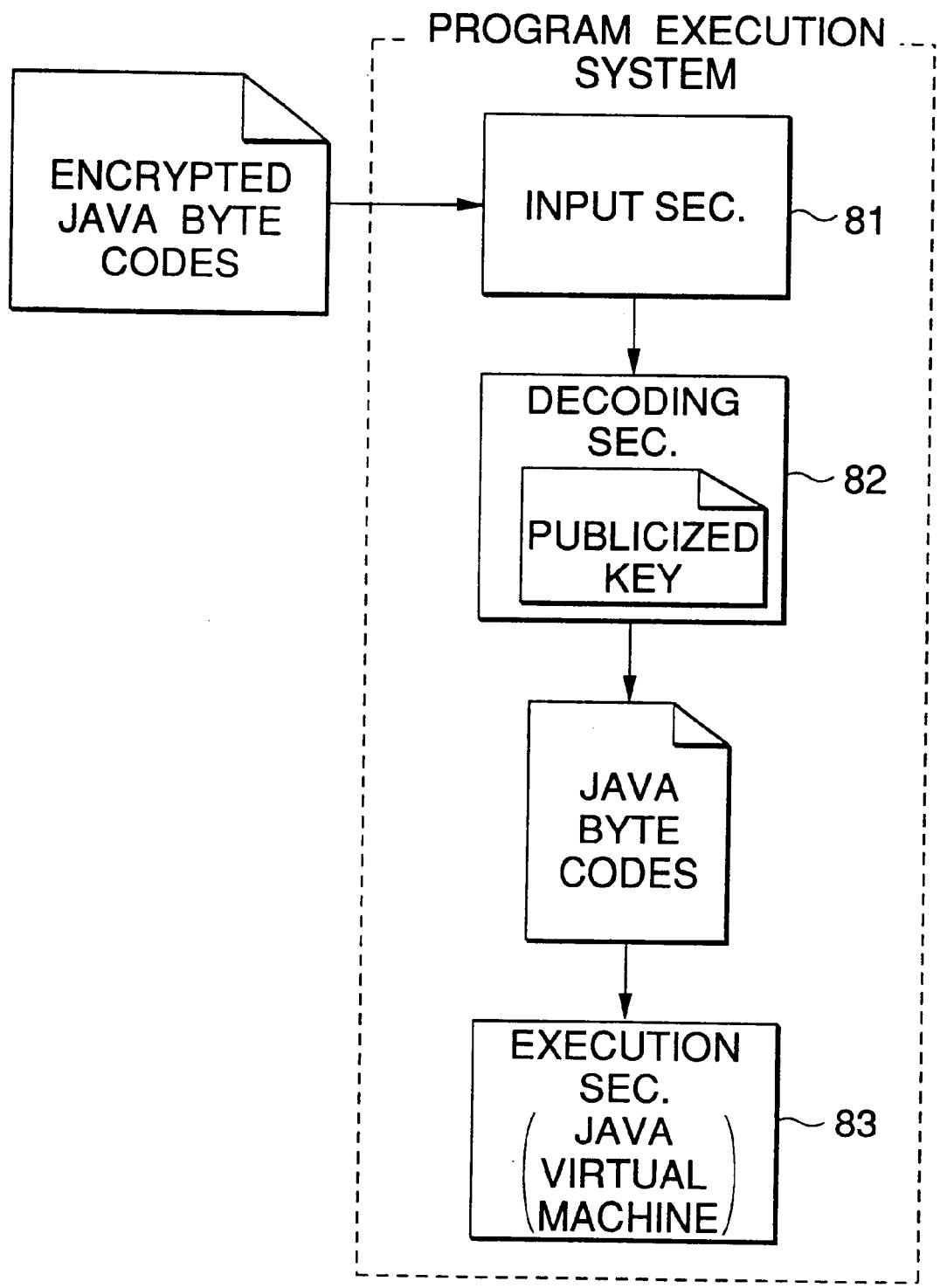
FIG. 15 is a block diagram showing a second example of functional configuration of a program execution system in which a publicized key is kept secret.

FIG. 15 shows an example of configuration of a program execution system in which a publicized key is kept secret. The components in FIG. 15 having the corresponding components in FIG. 1 are given the same reference numerals as the latter and descriptions therefor will be omitted where appropriate.

In this embodiment, for example, a publicized key is located at a single position or dispersed at a plurality of positions of a program that constitutes a program execution system including a Java virtual machine 83. A decoding section 82 decodes encrypted sentences by using such a publicized key. Therefore, in this case, the publicized key never leaks from the program execution system and hence it is possible to prevent an event that encrypted sentences are illegally decoded and reverse engineering is performed (or the possibility of occurrence of reverse engineering can be reduced).

The above description is directed to the case where in the user terminal 33 basically a decoding result of the decoding section 82 is input to the Java virtual machine 83 as it is. In the user terminal 33, there may be executed a process in which it is checked whether Java byte codes are legitimate, that is, they are certified by the program certificate authority and no falsification or the like is performed thereon, and only Java byte codes that have been affirmed to be legitimate are input to the Java virtual machine 83.

Figure 4:
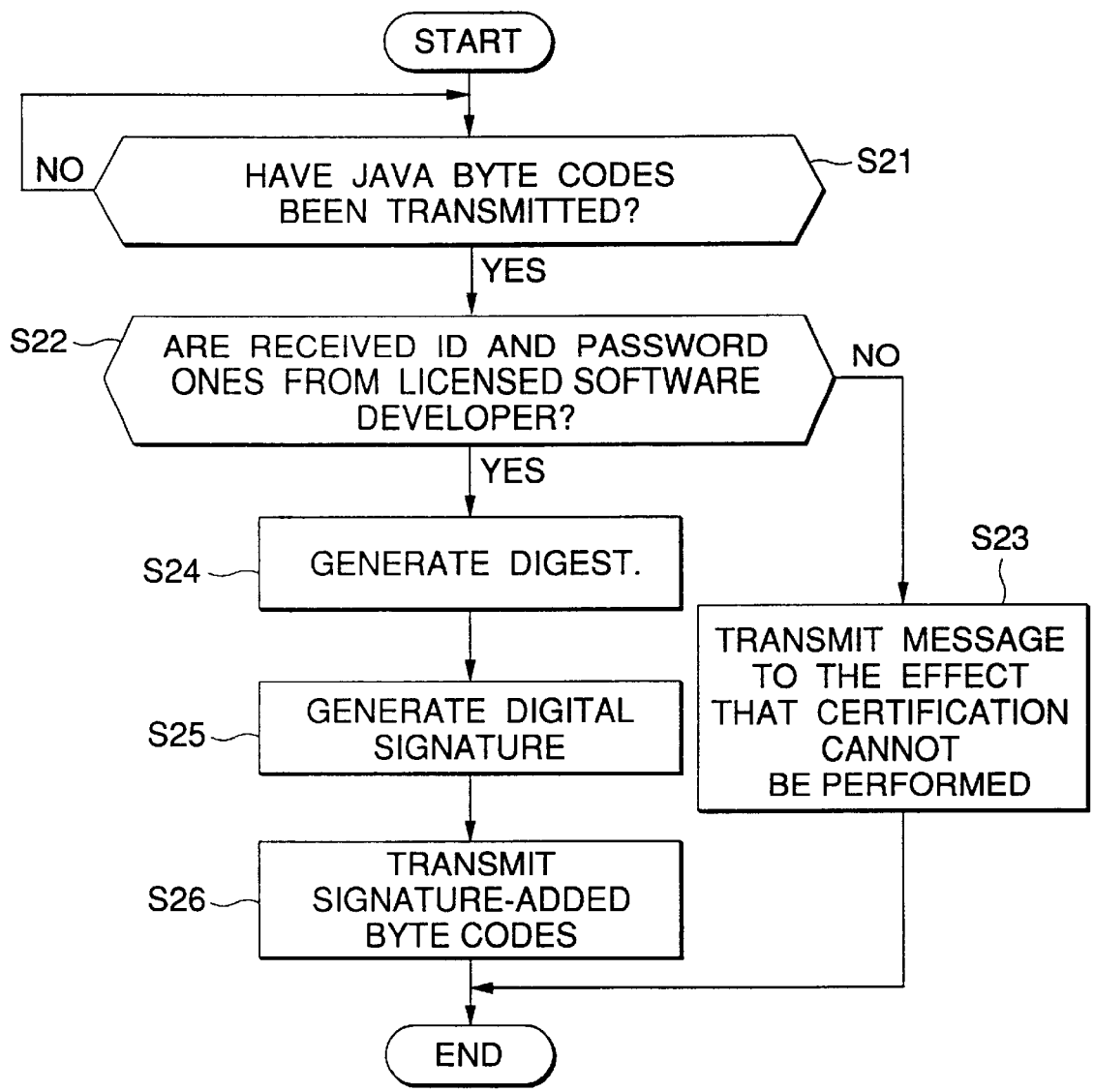
FIG. 4 is a flowchart showing a process of the program certificate authority server 32.

In this case, the program certificate authority server 32 executes a program certification process, for instance, according to a flowchart of FIG. 4 on Java byte codes as an application program that are transmitted from the software developer server 31.

Steps S21–S23 are the same as steps S11–S13 of FIG. 2, respectively.

If it is judged at step S22 that the transmitted Java byte codes are from a regular software developer, the process sequentially proceeds to steps S24–S26, whereby a signature (digital signature) for certifying that the Java byte codes are legitimate is added to the Java byte codes.

Specifically, the CPU 51 generates a digest of the Java byte codes at step S24. The process then goes to step S25, where the CPU 51 generates a digital signature from the digest that was generated at step S24. The process then goes to step S26, where the communication control section 47 adds the digital signature to the Java byte codes (Java byte codes to which a digital signature is added as in this case will be hereinafter called "signature-added byte codes" where appropriate) and transmits the signature-added byte codes to the software developer server 31. The process is then finished.

Next, a description will be made of a method of generating signature-added byte codes at steps S24–S26 in the program certificate authority server 32.

In the program certificate authority server 32, signature-added byte codes are generated, for instance, according to the public-key encryption scheme as typified by the RSA scheme.

Figure 16:
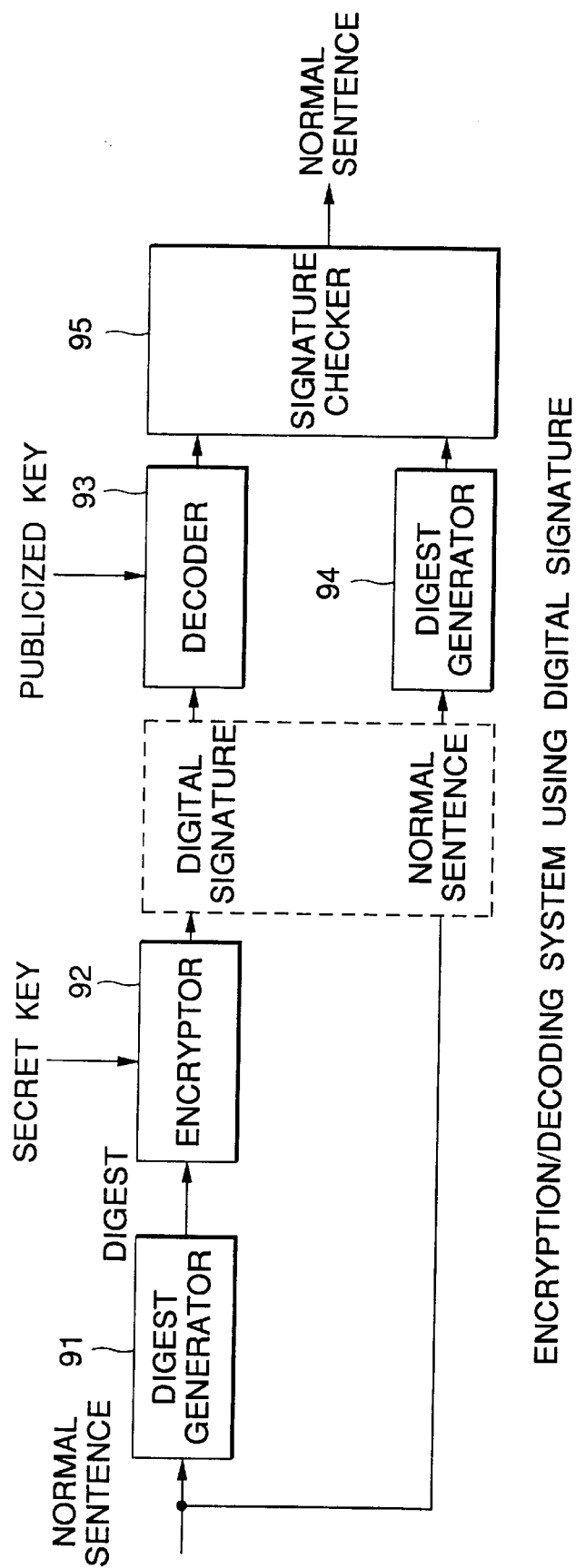
FIG. 16 is a block diagram showing an example of configuration of an encryption/decoding system using a digital signature.

FIG. 16 shows an example of configuration of an encryption/decoding system according to the publicized key encryption scheme using a digital signature.

A normal sentence as a subject of certification is input to a digest generator 91, which generates a digest of the received normal sentence according to such an algorithm as MD5 or SHA-1.

A digest corresponds to a mechanically condensed sentence of a normal sentence, and different digests are generated for different normal sentences as inputs. A digest is generated by converting a normal sentence by using a hash function, for instance.

Incidentally, a method of mapping a set of ranges that can be taken by a keyword used for searching a database to a certain limited numerical range (corresponding to a record number or a suffix of an array) is called hashing. A transformation function of this mapping is a hash function.

The digest generated by the digest generator 91 is supplied to an encryptor 92. The encryptor 92 encrypts the digest by using a secret key, for instance, like the encryptor 71 shown in FIG. 14, and outputs an encrypted digest as a digital signature. The digital signature is added to the original normal sentence and a resulting signature-added normal sentence is output.

On the other hand, the digital signature as part of the signature-added normal sentence is input to a decoder 93 and the sentence as the remaining part is input to a digest generator 94. The decoder 93 decodes the digital signature into a digest by using a publicized key, for instance, like the decoder 72 shown in FIG. 14. The digest thus obtained is supplied to a signature checker 95.

Like the digest generator 91, the digest generator 94 generates a digest of the received normal sentence and supplies it to the signature checker 95.

The signature checker 95 judges legitimacy of the signature (digital signature), i.e., checks the signature. Specifically, the signature checker 95 checks whether the digest that is output from the decoder 93 coincides with the digest that is output from the digest generator 94. If the two digests do not coincide with each other, the legitimacy of the signature is denied with a judgment that, for instance, the normal sentence has been falsified or the publicized key used in the decoder 93 is not a correct one.

On the other hand, if the digest that is output from the decoder 93 coincides with the digest that is output from the digest generator 94, the legitimacy of the signature is affirmed with a judgment that the normal sentence has not been falsified or the publicized key used in the decoder 93 is a correct one.

The signature checker 95 is also supplied with the normal sentence that constitutes the signature-added normal sentence. The signature checker 95 outputs the normal sentence when the legitimacy of the signature is confirmed.

In the program certificate authority server 32, Java byte codes that are transmitted from the software developer server 31 are converted into signature-added byte codes that correspond to the above signature-added sentences, whereby the Java byte codes are certified.

The signature generation method is not limited to the above one that utilizes the publicized key encryption scheme.

FIG. 3 shows an example of functional configuration of a program execution system as a program execution environment for checking legitimacy of an application program and executing only a legitimate one in the user terminal 33. The components in FIG. 3 having the corresponding components in FIG. 1 are given the same reference numerals as the latter and descriptions therefor will be omitted where appropriate.

An input section 101 accepts inputs basically in the same manner as the input section 81 of FIG. 1. The input section 101 is different from the latter in that it receives signature-added byte codes (Java byte codes to which a signature (digital signature) is added). The input section 101 separates the signature-added byte codes into a signature and Java byte codes and output those. The signature is supplied to a signature checking section 103 and the Java byte codes are supplied to a message digest system 102 and a virtual machine input control section 104.

The message digest system 102 executes a process that is similar to the process executed by the digest generator 94 of FIG. 16. That is, the message digest system 102 generates a digest from the Java byte codes and supplies it to the signature checking section 103. The signature checking section 103, which corresponds to the decoder 93 and the signature checker 95 of FIG. 16, checks legitimacy of the signature that is supplied from the input section 101.

Specifically, the signature checking section 103 receives the signature from the input section 101 and the digest from the message digest system 102. Further, the signature checking section 103 is supplied with a publicized key corresponding to a secret key that was used in generating the signature, for instance, in the same manner as the decoding section 82 of FIG. 1 is supplied with a publicized key. The signature checking section 103 decodes the signature into a digest by using the received publicized key, and checks legitimacy of the signature by comparing the thus-obtained digest with the digest that is supplied from the message digest system 102. Further, the signature checking section 103 controls the virtual machine input control section 104 in accordance with a check result.

The virtual machine input control section 104 controls, under the control of the signature checking section 103, supply to the Java virtual machine 83 of the Java byte codes that are supplied from the input section 101.

In the above-configured program execution system, first, the input section 101 acquires signature-added byte codes as an application program in the same manner as the input section 81 of FIG. 1. Then, the input section 101 separates the signature-added byte codes into a signature and Java byte codes, and supplies the signature to the signature checking section 103 and the Java byte codes to the message digest system 102 and the virtual machine input control section 104.

The message digest system 102 generates a digest from the Java byte codes that are supplied from the input section 101 and supplies the digest to the signature checking section 103. The signature checking section 103 decodes the signature that is supplied from the input section 101 into a digest by using a publicized key. Further, the signature checking section 103 compares the digest obtained by the decoding with the digest that is supplied from the message digest system 102, and judges the legitimacy of the signature that is supplied from the input section 101 based on whether the two digests coincide with each other.

If the legitimacy of the signature has been affirmed, that is, if the digest obtained by decoding the signature coincides with the digest supplied from the message digest system 102, the signature checking section 103 controls the virtual machine input control section 104 so that the Java byte codes that are supplied from the input section 101 are output to the Java virtual machine 83. The virtual machine input control section 104 supplies the Java virtual machine 83 with the Java byte codes that are supplied from the input section 101 under the control of the signature checking section 103.

Therefore, in this case, the Java virtual machine 83 interprets and executes the Java byte codes that are supplied from the input section 101 via the virtual machine input control section 104.

On the other hand, if the legitimacy of the signature has not been affirmed, that is, if the digest obtained by decoding the signature does not coincide with the digest supplied from the message digest system 102, the signature checking section 103 controls the virtual machine input control section 104 so that the Java byte codes that are supplied from the input section 101 are not output to the Java virtual machine 83.

In this case, the virtual machine input control section 104 does not output, to the Java virtual machine 83, the Java byte codes that are supplied from the input section 101. Therefore, the Java virtual machine 83 does not execute any process.

As described above, also in the case where a signature is added to certify an application program, it becomes possible to restrict distribution of Java byte codes that operate on the Java virtual machine 83 but are not certified by the program certificate authority to users having the user terminal 33 in which the Java virtual machine 83 is implemented. That is, it becomes possible to allow only software developers who have made a contract with the program certificate authority, to distribute Java byte codes that operate on the Java virtual machine 83 to users having the user terminal 33 in which the Java virtual machine 83 is implemented. The developer or the like of the Java virtual machine 83 can receive license fees from software developers who want to distribute Java byte codes that operate on the Java virtual machine 83.

In the case of adding a signature, it also becomes possible to, for instance, restrict execution on the Java virtual machine 83 of a falsified version of signature-added Java byte codes.

In the embodiment of FIG. 3, it is necessary to take a measure to allow only the virtual machine input control section 104 to input Java byte codes to the Java virtual machine 83.

It is noted that Java byte codes themselves exist in the case where a signature is added to Java byte codes, unlike the case where Java byte codes are encrypted. Therefore, in a program execution system that does not check the legitimacy of a signature (for example, in a program execution system in which Java byte codes as output from the input section 101 are directly input to the Java virtual machine 83), Java byte codes can be interpreted and executed without any limitations.

Conversely, in the case where a signature is added to Java byte codes, a developer and a seller of a Java virtual machine, a seller who sells a Java virtual machine as implemented in the user terminal 33, and like parties may configure a program execution system as shown in FIG. 3. A party who does not want to restrict the execution of Java byte codes may configure a program execution system in which the legitimacy of a signature is not checked.

The invention can be applied to not only Java virtual machines of both of the above-mentioned interpreter-type and JIT compiler type, but also virtual machines other than the Java virtual machine. The invention can even be applied to a case where input to a program execution system is made through machine codes as in the case of a processing system of the C language or the C++ language, and to a case where input to a program execution system is made through source codes as in the case of a processing system of the Basic language.

Although only a single program execution system is provided in the embodiments of FIGS. 1, 15 and 3, the program execution system can be provided in plurality in the user terminal 33. This will be exemplified below. Where a plurality of input sections 81 or 101 are provided, an encrypted sentence or signature-added byte codes can be input from a plurality of paths. Where a plurality of decoding sections 82 are provided, an encrypted sentence can be decoded according to a plurality of decoding algorithms. Where a plurality of Java virtual machines 83 are provided, it is possible to support a plurality of Java byte code formats. Further, where a plurality of message digest systems 102 and a plurality of signature checking sections 103 are provided, it is possible to check a plurality of signatures that have been added according to a plurality of techniques, respectively.

In the above embodiments, Java byte codes may be of any of a number of forms such as Java Application, Java Applet, Java Benas, and Java Class Library.

In the information processing apparatus and method according to one aspect of the invention, an encrypted version of a program is decoded and the program that is obtained by the decoding is then executed. On the recording medium according to this aspect of the invention, a program for causing a computer to perform the steps of decoding an encrypted version of a program and executing the program that is obtained by the decoding step is recorded. Therefore, it becomes possible to allow execution of only an encrypted program.

In the information processing apparatus and method according to another aspect of the invention, a program is encrypted into encrypted sentences to be decoded into executable codes. On the recording medium according to this aspect of the invention, a program being encrypted into encrypted sentences to be decoded into codes that can be executed by the information processing apparatus according to claim 1 is recorded. Therefore, it becomes possible to provide an encrypted program that can be executed by the information processing apparatus according to claim 1.

In the information processing apparatus and method according to another aspect of the invention, whether a program is an execution-permitted, legitimate one is checked and the program is executed only when it is affirmed to be a legitimate one. On the recording medium according to this aspect of the invention, a program for causing a computer to perform the steps of checking whether a program is legitimate and executing the program only when it is affirmed to be legitimate is recorded. Therefore, it becomes possible to allow execution of only a legitimate program.

In the information processing apparatus and method according to a further aspect of the invention, a program is processed so that its legitimacy will be affirmed in the information processing apparatus. On the recording medium according to this aspect of the invention, a program having been processed so that its legitimacy will be affirmed in the information processing apparatus. Therefore, it becomes possible to provide a program that has been processed so as to be executable by the information processing apparatus.

What is claimed is:

1. An information processing system which executes a process for executing a program, comprising:

transmitting means for transmitting by a software developer the program and software developer identification information to a program certificate authority center;

encrypting and certifying means included in the program certificate authority center for encrypting and certifying the transmitted program, based on the software developer identification information, as being licensed to execute in a predetermined proprietary program execution environment in which the program was developed, and for sending to the software developer an encrypted and certified version of the program;

receiving means included in a user terminal for receiving the encrypted and certified version of the program from the software developer;

decoding means included in the user terminal for decoding the received encrypted and certified version of the program using a decode key and outputting the decoded program; and executing means included in the user terminal for executing the decoded program that is output from the decoding means.

2. The information processing apparatus according to claim 1, wherein the decoding means decodes the encrypted version of the program by using a predetermined decode key corresponding to a predetermined encryption key that was used for encrypting the program.

3. The information processing apparatus according to claim 1, further comprising a predetermined decode key corresponding to an encryption key that was used for encrypting the program, wherein the decoding means decodes the encrypted version of the program by using the predetermined decode key.

4. An information processing method for executing a process for executing a program, comprising the steps of:

transmitting by a software developer the program and software developer identification information to a program certificate authority center;

encrypting and certifying at the program certificate authority center the transmitted program, based on the software developer identification information, as being licensed to execute in a predetermined proprietary program execution environment in which the program was developed, and sending to the software developer an encrypted and certified version of the program;

receiving at a user terminal the encrypted and certified version of the program from the software developer;

decoding in the user terminal the received encrypted and certified version of the program using a decode key; and executing in the user terminal the decoded program that is obtained by the step of decoding.

\* \* \* \* \*